United States Patent [19]
Wahl

[11] 3,773,231
[45] Nov. 20, 1973

[54] APPARATUS FOR PROMOTING DISCHARGE OF MATERIAL FROM A BIN OR THE LIKE

[76] Inventor: Eugene Wahl, Glen Ridge, N.J.
[22] Filed: June 12, 1972
[21] Appl. No.: 261,584

[52] U.S. Cl............................... 222/198, 222/199
[51] Int. Cl............................................. B65g 3/12
[58] Field of Search................... 222/161, 196, 197, 222/198, 199, 200, 227, 228

[56] References Cited
UNITED STATES PATENTS

| | | | |
|---|---|---|---|
| 3,353,720 | 11/1967 | Ricciardi | 222/200 |
| 2,254,448 | 9/1941 | Pursel | 222/200 |
| 3,261,508 | 7/1966 | Wahl | 222/199 |
| 3,469,719 | 9/1969 | Peterson | 222/228 |

Primary Examiner—Robert B. Reeves
Assistant Examiner—Thomas E. Kocovsky
Attorney—Rudolph J. Jurick

[57] ABSTRACT

A vibratable material-receiving member, carrying a baffle, is attached to the bottom of a storage bin to promote the discharge of material therefrom. The material-receiving member also carries arms extending upwardly into the bin, which arms carry the vibratory effect to material in the upper portions of the bin.

5 Claims, 5 Drawing Figures

APPARATUS FOR PROMOTING DISCHARGE OF MATERIAL FROM A BIN OR THE LIKE

BACKGROUND OF THE INVENTION

The invention relates to apparatus for promoting the flow of powdered or granular material from the bottom of a storage bin or the like. Apparatus of the class is shown in my U.S. Pat. No. 3173583, Mar. 16, 1965 and entitled Bin Activator. This apparatus comprises a generally conical material-receiving member suspended from a bin and vibrated by an electro-mechanical gyrator. The conical member as secured thereto a baffle, or a plurality of generally vertically extending arms, for the purpose of imparting vibrations to the material in the lower region of the bin. However, in the case of tall bins and/or bins containing sticky materials, the materials also cling to the sidewalls of the bin in the upper regions thereof, thereby forming partial bridges across cords of the bin circle and disrupting continuous flow of material out of the bin.

In apparatus made in accordance with this invention, a plurality of generally vertically extending arms are carried by and resiliently secured to the vibrated material-receiving member. These arms extend well up into the bin and function as vibration extenders to prevent bridging of the material in the upper regions of the bin.

SUMMARY OF THE INVENTION

A concave material-receiving member, having a discharge opening, is suspended from the bottom of a bin and vibrated by an electro-mechanical gyrator. An internal baffle is secured to the material-receiving member for imparting vibrations to material in the vicinity of the bin opening. A plurality of arms, resiliently secured to the material-receiving member, extend upwardly into the bin and transmit vibrations to the material well beyond the perimeter of the material-receiving member.

An object of this invention is the provision of improved apparatus for promoting flow of material from a bin or the like.

An object of this invention is the provision of apparatus for promoting continuous flow of particulate material from an opening in the bottom of a bin, which apparatus includes means for imparting vibrations to the material in various regions of the bin.

An object of this invention is the provision of vibratable apparatus attachable to a storage bin and including means for preventing undesirable bridging of the material in upper portions of the bin.

The above-stated and other objects and advantages will become apparent from the following description when taken with the accompanying drawings. It will be understood, however, that the drawings are for purposes of illustration and are not to be construed as defining the scope or limits of the invention, reference being had for the latter purpose to the claims appended hereto.

BRIEF DESCRIPTION OF THE DRAWINGS

In the drawings wherein like reference characters denote like parts in the several views.

DESCRIPTION OF THE PREFERRED EMBODIMENT

Figure 2:
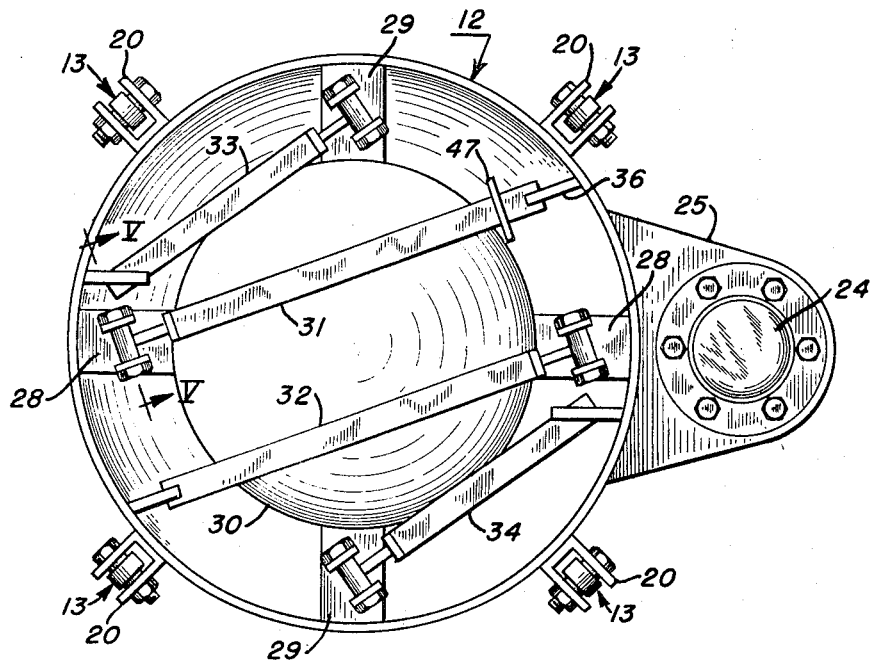
FIG. 2 is a top plan view thereof.
Figure 1:
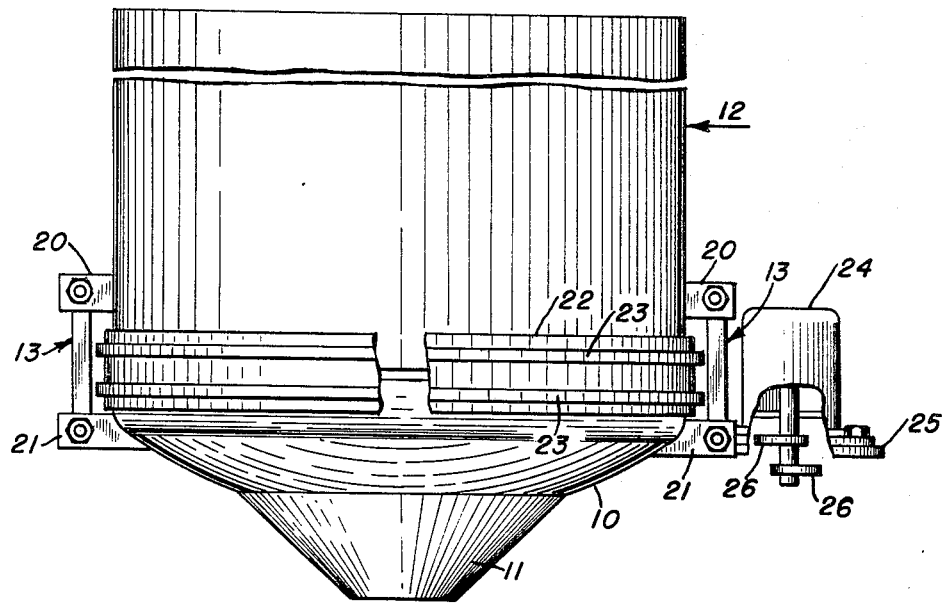
FIG. 1 is a side elevational view, with portions broken away, and showing apparatus made in accordance with this invention and attached to a storage bin.
Figure 4:
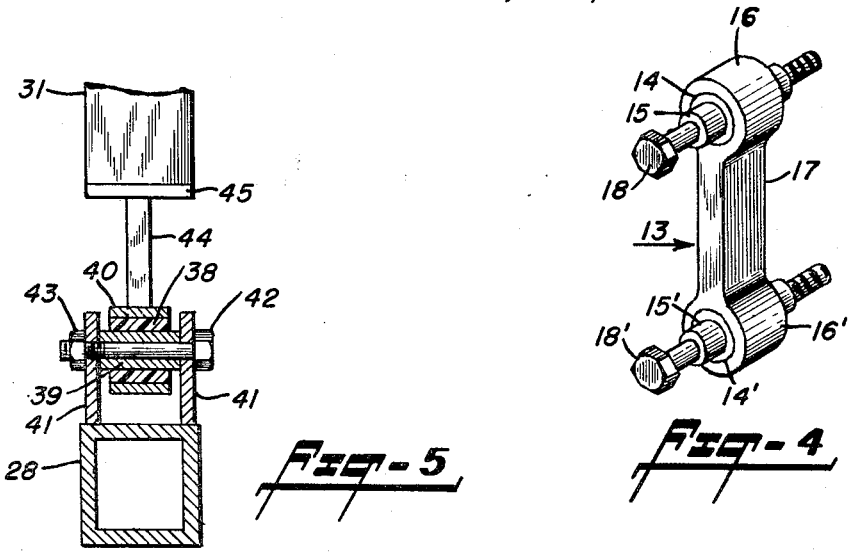
FIG. 4 is an isometric view of one of the vibration-isolating suspension mountings.

Referring to the drawings, the bin activator apparatus comprises a concave material-receiving member 10 terminating in a conical spout 11 constituting a discharge opening. The member 10 is suspended from the open bottom of a storage bin 12 by four vibration-isolating suspension mountings 13. As shown in FIG. 4, each suspension mounting comprises rubber cylinders 14 and 14' which are bonded to metal sleeves 15 and 15', respectively, and then pressed into openings formed in the integral, cylindrical end portions 16, 16' of the steel link 17. The sleeves are somewhat longer than the rubber cylinders which have an axial length substantially equal to that of the link end portions 16, 16'. The suspension mounting is secured in place by means of nuts threaded onto the mounting bolts 18, 18' passing through the sleeves 15, 15'. Referring to FIGS. 1 and 2, the upper ends of the suspension mountings 13 are bolted to U-shaped brackets 20 welded to the bin 12 and the lower ends of the mountings are bolted to similar brackets welded to the material-receiving member 10.

The upper end portion of the material-receiving member 10 has a uniform diameter corresponding to that of the bin, and the end wall of the member 10 is spaced from the end wall of the bin. This space is closed by a flexible band 22 secured in place by metal straps 23. An electro-mechanical gyrator 24 is bolted to a rigid plate 25 which is welded to the material-receiving member. The gyrator has eccentrically-mounted weights 26, FIG. 1, secured to the drive shaft of an electric motor. When the motor is energized, the weights rotate in a horizontal plane, thereby imparting vigorous, orbital vibrations to the material-receiving member and all parts secured thereto.

Figure 3:
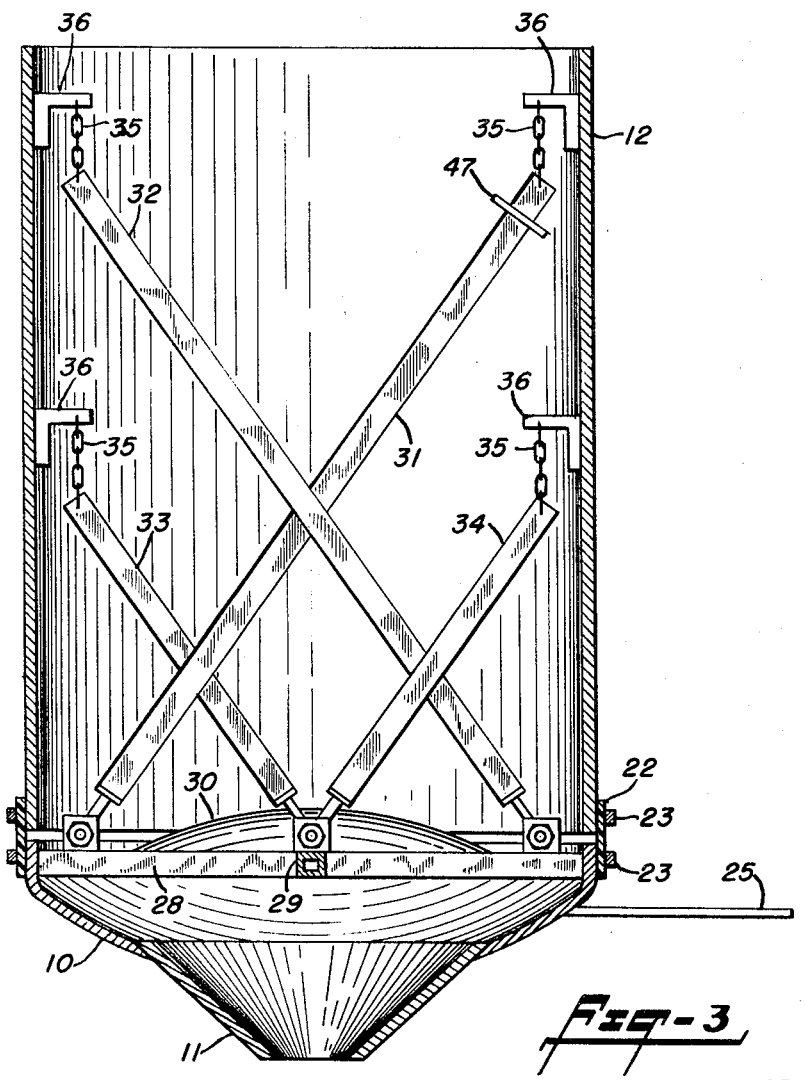
FIG. 3 is generally similar to FIG. 1 but with the walls of the bin and material-receiving member broken away to show the relative arrangement of the vibration extenders.
Figure 5:
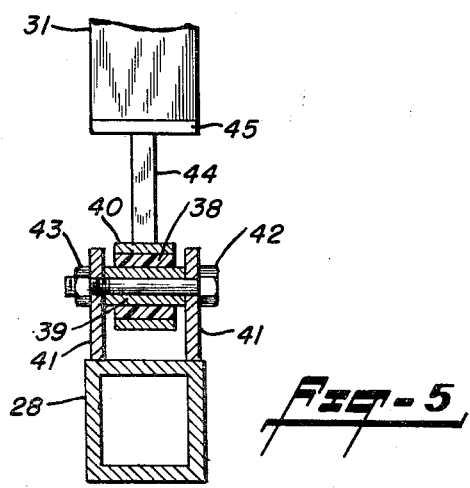
FIG. 5 is an enlarged, cross-sectional view taken along the line V—V of FIG. 2.

A pair of diametrically-oriented crossbars 28 and 29 have ends welded to the inner wall of the material-receiving member, said crossbars being hollow, tubular members of generally square cross-sectional configuration. An inverted, spherical baffle 30 overlies the spout 11 and has its peripheral surface welded to the crossbars. Also secured to the crossbars are a plurality of steel, tubular arms 31-34 which extend upward into the bin. The lower ends of these arms are secured to the associated crossbars by resilient connectors, whereas the upper ends of the arms are suspended by the chains 35 extending from brackets 36 welded to the inner wall of the bin, see particularly FIG. 3. The construction of the resilient connectors is shown in FIG. 5 to which reference now is made. The connector comprises a rubber bushing 38 bonded to an inner, metal sleeve 39 and pressed into an outer metal sleeve 40. The inner sleeve 39 is secured to the spaced plates 41 by means of the bolt 42 and nut 43, said plates being welded to the crossbar 28. A steel link 44 has one end welded to the sleeve 40 and the other end welded to an end plate 45, which end plate is welded to the end of the tubular arm 31.

When the gyrator is in operation, the vibrations of the material-receiving member 10 and the baffle 30 assure a positive flow of material from the lower portion of the bin to the material-receiving member and out of the spout 11. Vibrations also are imparted to the generally vertically-extending arms 31–34, thereby extending the vibratory effect well beyond the bin bottom, thus eliminating undesirable bridging of the material in the bin, even in the case of sticky materials. Attaching these arms to the crossbars of the material-receiving member by means of the described resilient connection, eliminates the development of fatigue stresses at the connection point and hence breaking of the connection, as would otherwise occur with a solid connection. Similarly, fatigue stresses are eliminated at the upper ends of the arms by reason of the flexible chain suspensions thereof. At the same time, such suspension of the arms affords a certain amount of lateral movement of the arms which, effectively, extends the area over which vibrations are transmitted to the surrounding material. The vibratory effect can be further increased by attaching plates to the arms perpendicular to the arm axis, as, for example, the plate 47 shown attached to the arm 31, FIG. 3.

While the invention has been described specifically with reference to apparatus having four vibration-extending arms extending upwardly into the bin, it will be apparent that a greater or lesser number of arms may be used depending upon the size of the bin and the particular material stored therein. Also, the assemblage comprising the material-receiving member, baffle and upwardly extending arms is not limited for use with a storage bin as such assemblage also is adapted for use under storage piles supported by a floor. In this case, the material-receiving member would be suspended under an opening formed in the floor and cable suspensions for the vibration-extending arms would be supported by posts secured to the floor.

Having now described the invention what I desire to protect by letters patent is set forth in the following claims.

I claim:

1. Apparatus comprising,
   a. a circular storage bin having a bottom opening,
   b. a concave member terminating in a discharge opening and having internal crossbars secured thereto,
   c. a conical baffle having a peripheral surface secured to the said crossbars and spaced from the inner wall of the concave member,
   d. a plurality of rigid, elongated arms,
   e. resilient means mechanically coupling one end of each arm to the said crossbars,
   f. flexible means suspending the other end of each arm from the bin, each arm lying in a plane containing a chord of the bin circle,
   g. an electro-mechanical gyrator secured to the concave member, and
   h. means suspending the said convave member from the bin.

2. The invention as recited in claim 1, wherein the said resilient means comprises a rubber bushing bonded to an internal sleeve and pressed into an outer metal sleeve; a rigid link connected between the end of the elongated arm and the said outer sleeve, spaced supporting members secured to a crossbar, and means removably connecting the said internal sleeve to said supporting members.

3. The invention as recited in claim 1, wherein at least one of said elongated arms extends into the upper region of the bin.

4. The invention as recited in claim 1, wherein at least one of said elongated arms carries a plate lying in a plane substantially normal to the axis of the arm.

5. The invention as recited in claim 1, wherein the said elongated arms are hollow, tubular members of generally square cross-section.

* * * * *